United States Patent
Sharp-Paul et al.

(10) Patent No.: US 11,023,610 B2
(45) Date of Patent: Jun. 1, 2021

(54) DATA BREACH DETECTION AND MITIGATION

(71) Applicant: UpGuard, Inc., Mountain View, CA (US)

(72) Inventors: Alan James Sharp-Paul, Los Altos, CA (US); Christopher Robert Vickery, Santa Rosa, CA (US); Jonathan David Hendren, Mountain View, CA (US); Gregory Ford Pollock, San Jose, CA (US); Daniel Bradbury, Sydney (AU); Christian Alan Kiely, Sydney (AU); Gavin Richard Turner, Holgate (AU); Michael Franz Baukes, Sunnyvale, CA (US)

(73) Assignee: UPGUARD, INC., Mountain View, CA (US)

( * ) Notice: Subject to any disclaimer, the term of this patent is extended or adjusted under 35 U.S.C. 154(b) by 311 days.

(21) Appl. No.: 16/254,605

(22) Filed: Jan. 23, 2019

(65) Prior Publication Data

US 2020/0233971 A1 Jul. 23, 2020

(51) Int. Cl.
| | |
|---|---|
| *H04L 9/00* | (2006.01) |
| *G06F 21/62* | (2013.01) |
| *G06F 16/22* | (2019.01) |
| *H04L 29/06* | (2006.01) |
| *G06F 16/2457* | (2019.01) |
| *G06F 21/60* | (2013.01) |

(52) U.S. Cl.
CPC .......... *G06F 21/6218* (2013.01); *G06F 16/22* (2019.01); *G06F 16/24578* (2019.01); *G06F 21/604* (2013.01); *H04L 63/083* (2013.01); *H04L 63/0823* (2013.01)

(58) Field of Classification Search
CPC .. G06F 21/604; G06F 21/554; G06F 21/6218; G06F 16/22; H04L 63/083; H04L 63/0823; H04L 63/1416
See application file for complete search history.

(56) References Cited

U.S. PATENT DOCUMENTS

| | | | | |
|---|---|---|---|---|
| 9,032,531 | B1 * | 5/2015 | Scorvo | H04L 63/1408 726/25 |
| 10,346,623 | B1 * | 7/2019 | Brandwine | G06F 21/552 |
| 10,846,431 | B2 * | 11/2020 | Mascaro | H04L 63/1441 |
| 2015/0073981 | A1 * | 3/2015 | Adjaoute | G06Q 30/0225 705/39 |
| 2018/0268135 | A1 * | 9/2018 | Nachenberg | G06F 21/602 |
| 2019/0347660 | A1 * | 11/2019 | Wilkinson | G06F 16/2308 |
| 2020/0143500 | A1 * | 5/2020 | DeBeaune | G06Q 50/265 |

* cited by examiner

*Primary Examiner* — Beemnet W Dada
(74) *Attorney, Agent, or Firm* — Fenwick & West LLP

(57) ABSTRACT

A breach detection engine detects and mitigates the effects of breaches across one or more data sources. An index is generated based on one or more data sources and the index is queried using keywords indicative of potential breaches. A database of potential breaches is populated based on the query of the index. The potential breach database is queried using keywords associated with a system identity (e.g., a third party). A likelihood of a candidate breach is identified based on a set of breach criteria weights. A network node associated with a candidate breach determined to be an actual breach is identified for isolation or for the performance of one or more additional security actions.

20 Claims, 3 Drawing Sheets

100

DATA BREACH DETECTION AND MITIGATION

BACKGROUND

1. Technical Field

The subject matter described generally relates to breach detection and mitigation, particularly to breach detection across multiple data sources.

2. Background Information

Data breaches can include security incidents where data is copied, transmitted, viewed, used, etc. by an unauthorized user or entity. Data breaches can compromise sensitive information stored in a data source. In many cases, data breaches involve exposure of financial information, personal health information, personally identifiable information, trade secrets, and other sensitive data. Data breaches often go undetected for large periods of time, at least in part because they can occur across a variety of data sources. It can be difficult and time consuming to identify breaches when they occur, thus delaying potential mitigation actions that can be taken in response to the data breaches, and increasing the negative consequences of the breaches.

SUMMARY

A breach detection engine detects and mitigates the effects of breaches across one or more data sources. In some embodiments, the breach detection engine crawls one or more data sources to generate an index. The index is queried using keywords indicative of breaches to produce first query results. Based on the first query results, a potential breach database is populated. The potential breach database is queried using keywords associated with a system identity to produce second query results. The system identity can be a third party such as a corporation, an agency, a business, etc. A candidate breach may be identified based on the second query results. In some embodiments, the second query results are associated with sensitive data (e.g., financial data, personally identifiable data, etc.).

A likelihood that the candidate breach is an actual breach is computed by weighting the results of the second query using a set of breach criteria weights. Such likelihoods may be computed based on a sensitivity level or classification of data associated with the second query results. The likelihoods can also be computed based on a presence of a source code, certificate authority keys, API keys, and/or system credentials within the second query results. Responsive to the computed likelihood that a candidate breach is an actual breach exceeding a breach threshold, the breach detection engine can identify a network node associated with the candidate breach in order to perform one or more breach mitigation or security actions with respect to the identified network node.

In some embodiments, a security engine, in response to the detection of a data breach and an identification of a network node associated with the data breach, performs a remedial action with respect to the data breach and/or the identified network node. For example, the security engine may automatically identify credentials (e.g., a username and/or password) associated with the candidate breach, revoke the credentials, and initiate a process of resetting the credentials for an entity associated with the candidate breach. In alternative examples, the security engine may locate and block a port of a computing system associated with a candidate breach, take a snapshot of data associated with the candidate breach for subsequent evaluation and auditing by a security entity, provide a recommendation to an entity associated with the identified network node, generate an insurance claim based on the candidate breach, and/or notify the public of the candidate breach. In some embodiments, the remedial action performed by the security engine may be selected based on the computed likelihood that the candidate breach is an actual breach (e.g., more severe remedial actions may be taken in response to a first candidate breach associated with a higher likelihood than a second candidate breach associated with a lower likelihood). The security engine acts to mitigate the effects of the breach, in some cases preventing sensitive information from being leaked further or exposed longer.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Systems

Figure 1:
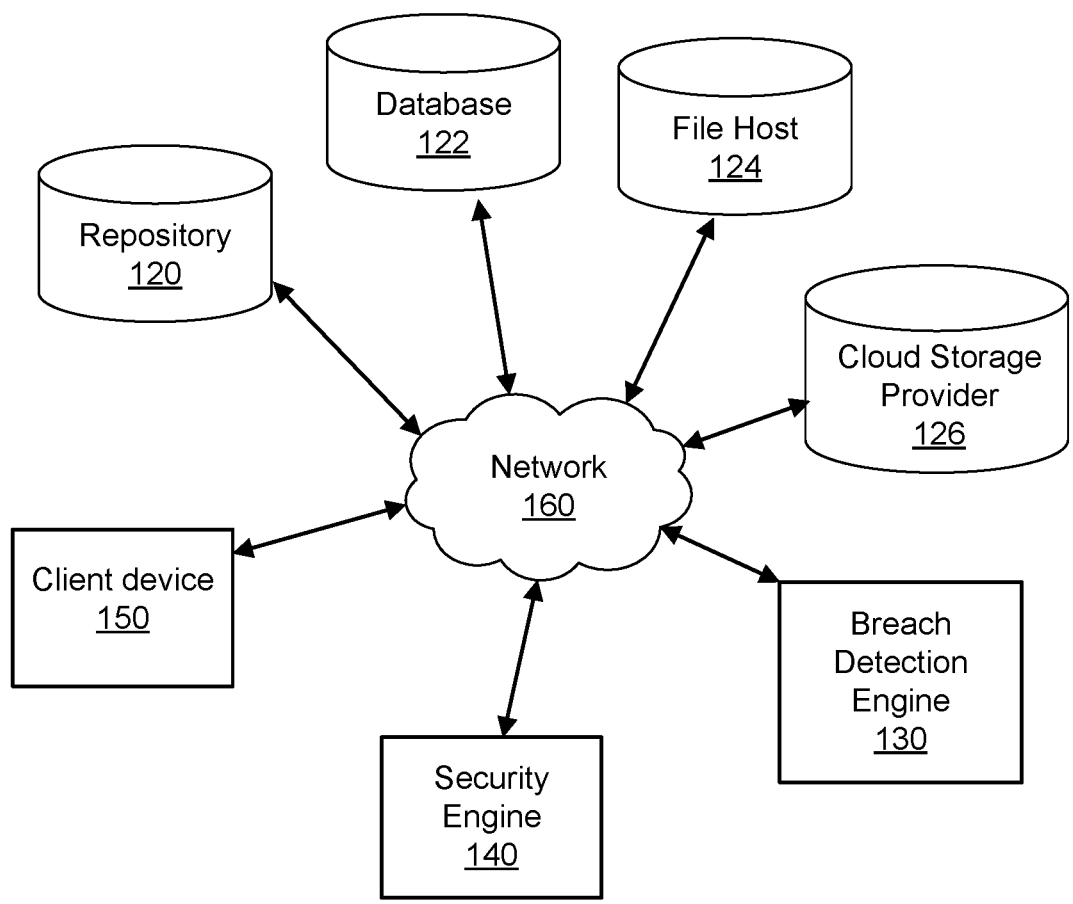
FIG. 1 is a block diagram illustrating a system environment for data breach detection and mitigation, according to one embodiment.

FIG. 1 illustrates a system environment 100 for breach detection and mitigation. In the embodiment, the system environment 100 includes a plurality of data sources (e.g., a repository 120, a database 122, a file host 124, a cloud storage provider 126), a breach detection engine 130, a security engine 140, and a client device 150 connected via a network 160. In other embodiments, the system environment 100 contains different and/or additional systems, for instance different types of data sources. In addition, the functions may be distributed among the systems in a different manner than described herein.

The data sources shown in FIG. 1 include a repository 120, a database 122, a file host 124, and a cloud storage provider 126. The system environment 100 includes four data sources, but in other embodiments, the network 160 may include fewer or additional data sources. In general, data sources allow users (e.g., a user of a client device 150) or other entities to store and retrieve information, although each data source shown in FIG. 1 may have more specific functionality and/or structure. For example, the primary function of each data source in FIG. 1 may be as follows: the repository 120 hosts source code for a related software company, the database 122 stores employee sensitive information in a table or index, the file host 124 hosts files for users of a related network, and the cloud storage provider 126 stores data accessible to a user of a related cloud system. In alternative embodiments, each data source can have different primary functions and/or structures than described herein. Data owners and/or information of the data owners stored in the data sources may be associated with a system identity. As used herein, a "system identity" refers to a third party (e.g., a corporation, an agency, a group, etc.) that stores the data in the data sources. In some embodiments, the data stored within the data sources (e.g., data owned by a data owner and managed by an entity associated with a system identity) can include sensitive information such as financial information, personal health information, personally identifiable information, trade secrets, etc.

The client device 150 is a computing device capable of receiving user input as well as transmitting and/or receiving data via the network 160. The client device 150 can have various forms such as a computer, a personal digital assistant (PDA), a tablet device, and other suitable devices. The client device 150 can be configured to interact with and/or provide input to the breach detection engine 130. The client device 150 can also be the device of a user of a data source (e.g., file host 120, database 122, etc.). In some embodiments, the client device 150 receives a notification or recommended action related to a candidate breach, described in greater detail below. Although only one client device 150 is shown, in practice, fewer or greater client devices 150 may be connected to the network 160 at a given time.

The information stored by the data sources may be accessed via the network 160. The network 160 can be any suitable network, such as the Internet, a LAN, a MAN, a WAN, a mobile wired or wireless network, a private network, a virtual private network, a direct communication line, and the like. The network 160 can also be a combination of multiple different networks of the same or different types.

The breach detection engine 130 analyzes the data sources (e.g., repository 120, database 122, file host 124, cloud storage provider 126) to isolate a candidate breach. In the embodiment of FIG. 1, the breach detection engine 130 indexes data retrieved from one or more data sources to generate a potential breach database. The breach detection engine 130 determines a likelihood of a candidate breach associated with the potential breach database based on a set of breach criteria weights, described in greater detail below in relation to FIG. 2. Responsive to the likelihood that a candidate breach is an actual breach exceeding a breach threshold, the breach detection engine 130 can identify a network node associated with a candidate breach to isolate the candidate breach. In some embodiments, an identification of the candidate breach or an identification of a network node associated with the candidate breach can be provided to the security engine 140 via the network 160. The security engine 140, described in greater detail below, can automatically act to mitigate a candidate breach and/or provide notice or a recommended action to the client device 150 in response to the candidate breach.

Figure 2:
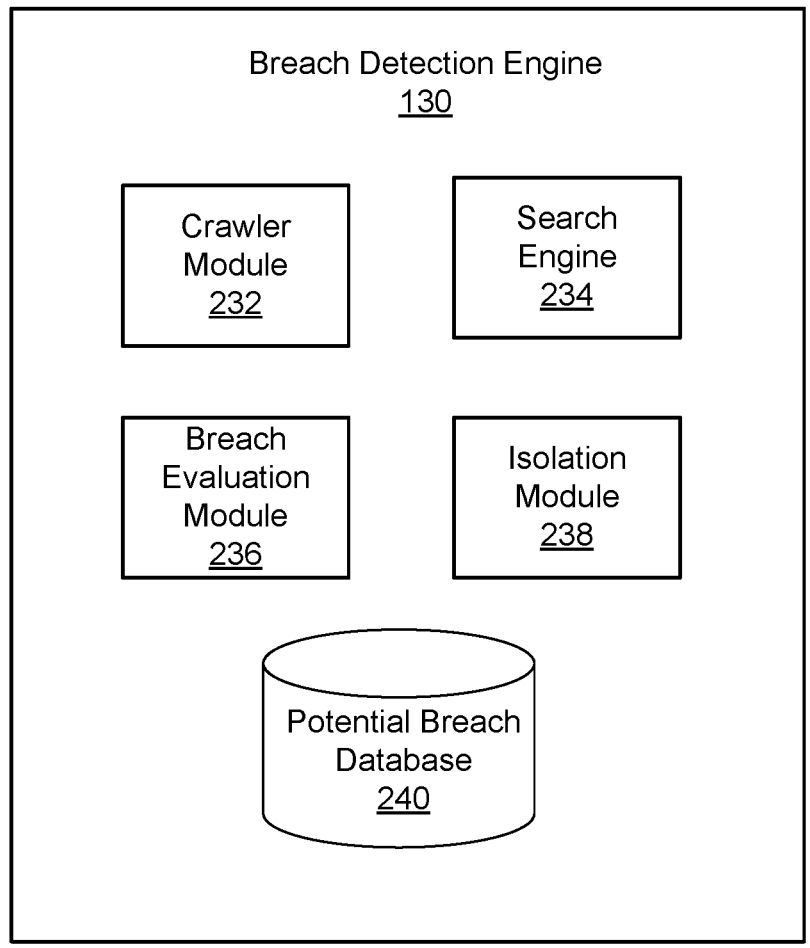
FIG. 2 is a block diagram illustrating a breach detection engine of FIG. 1, according to one embodiment.

FIG. 2 is a block diagram of the breach detection engine 130, according to the embodiment of FIG. 1. The breach detection engine 130 includes a crawler module 232, a search engine 234, a breach evaluation module 236, an isolation module 238, and a potential breach database 240. In other embodiments, the breach detection engine 130 can include fewer or more components than described below. In addition, the functions may be distributed among the components in a different manner than described below.

The crawler module 232 crawls one or more data sources to generate an index. In some embodiments, the crawler module requests or accesses data (such as data tables, data files, indexes within the data sources, and the like), and generates a searchable index based on the requested or accessed data. In some embodiments, the crawler module 232 generates an index based on data stored within the data sources over a previous pre-determined interval of time, based on all data uploaded to the data sources since a previous index was generated by the crawler module, based on data stored within the data source in particular folders associated with one or more data owners or entities, or based on a particular type of data stored within the data sources (such as data file types, data associated with a particular data format, and the like).

The search engine 234 queries the index generated by the crawler module 232 to identify potential breaches. In one embodiment, the search engine 234 queries the index using keywords associated with sensitive data and/or keywords indicative of potential breaches. Examples of such keywords can include: accounting, admin, administrator, all, alpha, api, app, appdev, archive, backend, backup, backups, beta, bin, build, certificates, .cert, certs, cfg, cloud, cms, conf, config, core, corp, credentials, creds, data, database, dev, devel, develop, db, host, ids, info, infra, infrastructure, intranet, j son, key, keys, live, log, logging, logs, mail, main, marketing, misc, more, mysql, net, new, old, oracle, org, passwords, personal, .pie, postgres, primary, private, prod, public, readonly, remote, root, router, safe, sales, save, saved, sec, secondary, secret, secure, security, server, share, smtp, sql, stage, staging, stats, storage, store, system, temp, template, test, testing, uat, untitled, update, upload, uploads, user, users, vpn, world. Keywords can also include a url associated with company, a user name, or an API key. For example, the search engine 234 can query the generated index using the keyword "bankofamerica.com" and using wild card operators in the format of a bank account number; the results of the query can include files that include the keyword or bank account formatted data. The search engine 234 can then aggregate the results of one or more such queries and can populate the potential breach database 240 with the aggregated results.

The search engine 234 performs a second query by querying the potential breach database 240 for breaches associated with a system identity (e.g., a third party such as a corporation, an agency, etc.). In one embodiment, the search engine 234 queries the potential breach database 240 using one or more character strings, a domain, a URL, and/or other keywords related to a system identity. For example, the search engine 234 queries the potential breach database 240 for potential breaches associated with the system identity Company ABC using character strings "ABC", "CompABC", "Company ABC", and "ABCco.com". In other embodiments, the search engine 234 queries the potential breach database 240 using an image associated with a system identity (e.g., a logo), for instance to identify documents within the potential breach database 240 determined using image recognition to include the logo. In some embodiments, the client device 150 provides inputs to the search engine 234 to query the potential breach database 240 for breaches associated with a system identity (for instance, at the request of a security officer or other user associated with the client device 150). In other embodiments, the search engine 234 is automated such that the potential breach database 240 is queried at regular intervals and/or without explicit input from a client device 150 or other entity. The second query results generated by the search engine 234 can include documents, spreadsheets, tables, or other data associated with the system identity that may be indicative of a breach.

The breach evaluation module 236 can identify and analyze a candidate breach based on the second query results. In some examples, a candidate breach may not be an actual breach (e.g., a candidate breach may include data that has similarities to sensitive data but doesn't include actual sensitive data). As such, the breach evaluation module 236 can determine a likelihood that a candidate breach is an actual breach by weighting the second query results using a set of breach criteria weights. In some embodiments, each breach criteria weight is associated with one or more types of query results and represents a correlation between the query result types and an actual data breach. Likewise, some breach criteria weights can represent a negative correlation between a query result type and an actual data breach.

The likelihood that a candidate breach is an actual breach can be computed based on characteristics of the second query results. In some embodiments, a classification of data associated with the second query results is used to calculate the likelihood of the candidate breach. As such, certain classifications of data may be considered more indicative of a breach than other classifications of data. Data may be classified according to its type, its level of accessibility, its content, access rights associated with the data, etc. Furthermore, a sensitivity level of the data associated with the second query results can be used to compute the likelihood of the candidate breach. For example, financial data (e.g., bank information, credit card information) associated with the second query results may be considered more sensitive than demographic data (e.g., location of a user, gender of a user) associated with the second query results. As such, the computed likelihood that a candidate breach is an actual breach can be greater when the second query results including financial database as opposed to simply demographic data.

The likelihood of a candidate breach can also be based on a presence of other information within the second query results, such as access credentials, certificate authority keys, and/or source code. For example, access credentials can include a username and password of a user that stores information in a data source. Some usernames (e.g., arbitrary strings of characters, usernames with foreign symbols, etc.) may be considered more indicative of a breach than other usernames (e.g., usernames related to a user's initials, usernames that include identifiable words, etc.). In some embodiments, system credentials stored across multiple data sources can be compared to determine similarities and/or correlations that may be indicative of breaches. For example, a set of system credentials found in a database 122, a file host 124, and a cloud storage provider 126 may be indicative of a breach across all three data sources and/or may be more indicative of a breach than system credentials found only in the database 122. Likewise, the presence of a same password associated with different user names or accounts within data stored by multiple data sources may indicate a higher risk of a breach. The presence of certificate authority keys and source code may increase a computed likelihood that a candidate breach is an actual breach.

A set of breach criteria weights can include a weight for each of the sensitivity level of data within the second query results, the classification of data within the second query results, the presence of access credentials within the second query results, certificate authority keys within the second query results, a source code within the second query results. In alternative embodiments, the set of breach criteria weights can include weights based on fewer, more, or different factors. The weights within the set of breach criteria weights can vary based on the correlation between each associated factor and an actual data breach. For example, the classification of data can be weighted greater than the sensitivity of the data. Furthermore, different classifications and/or different sensitivity levels of data may each have different weights (e.g., financial data is weighted differently than public profile data). The criteria can be weighted automatically by the breach evaluation module 236, or can be weighted according to input from the client device 150. In some embodiments, the set of breach criteria weights can be set of a security officer, a user of the client device 150, an entity associated with a system of FIG. 1, based on the results of one or more machine learning operations performed on search results in association with previously occurring data breaches, and the like.

In some embodiments, the likelihood that a candidate breach is an actual breach is computed based on breach scores computed for each result of the second query results. The breach score for each result of the second query is computed and weighted with an associated breach criteria weight to generate a weighted breach score. The weighted breach scores of each of the results of the second query can be summed, averaged, or otherwise combined to compute the likelihood that the candidate breach is an actual breach. The breach score for a query result can be computed based on characteristics associated query result, as described above. For example, the breach score can be based on the sensitivity level of the data included within the query result, the classification of the data, the presence of a source code within the query result, the presence of system credentials within the query result, and/or the presence of certificate authority keys within the query result. As noted above, a breach score may be weighted with an associated breach criteria weight. For example, different sensitivity levels of data may be ranked on a scale from 0 to 1 where financial data may have a higher weight (e.g., 0.9) than user profile data (e.g., 0.1). As such, the weighted breach score may be lower for a query result associated with user profile data compared to a query result associated with financial data. The breach criteria weight can be different for each breach score and/or criteria.

The breach evaluation module 236 can also evaluate a liability score for a system identity based on the results of the second query. The liability score may be calculated based on the likelihood that the candidate breach is an actual breach, the quantity of candidate breaches and/or query results associated with the system identity, and/or characteristics of one or more candidate breaches (such as an average sensitivity of data included within query results associated with each candidate breach). For example, if the candidate breach associated with Company ABC has a 90% likelihood of being an actual breach, and a candidate breach associated with Company 123 has a 50% likelihood of being an actual breach, the liability score computed for Company ABC may be greater than the liability score computed for Company 123. Alternatively, if Company 123 is associated with 30 candidate breaches, while Company ABC is only associated with 3 candidate breaches, Company 123 may have a higher liability score. The criteria used to calculate the liability score can be weighted in a similar manner as described above. In other embodiments, the liability score can be calculated on additional elements not described above. The liability score can be provided to the client device 150, can be provided to a system associated with the system identity of the second query, can be provided to an insurance or actuarial entity, can be provided to a regulatory authority, or can be provided to any other suitable entity.

The isolation module 238 isolates a network node associated with a candidate breach based on the second query of the potential breach database 240 and the analysis performed by the breach evaluation module 236. As described above, the breach evaluation module 236 calculates a likelihood that a candidate breach is an actual breach. If the likelihood exceeds a breach threshold, the isolation module 238 identifies a network node associated with the candidate breach for isolation. A network node can be identified based on the results of the second query. For example, some or all of the results of the second query may identify or be associated with a particular node (for instance by including a URL, IP address, web address, or network path representative of the particular node), and that node is selected for isolation. Likewise, a network node associated with a system identity of the second query or other entity associated with the results of the second query may be identified for isolation. In alternative examples, a network node can be identified based on other information found in the second query results (e.g., a network node is associated with source code, system credentials, and/or certificate authority keys found in the second query results). The breach threshold can be set by the client device 150, by the breach detection engine 130, or by any user or entity, such as those associated with the environment of FIG. 1. In some examples, a plurality of candidate breaches may be identified based on the results of the second query. The plurality of candidate breaches can be organized according to the likelihood that each candidate breach is an actual breach (e.g., in an order from most likely to least likely). In some embodiments, the isolation module 238 isolates a network node associated with a candidate breach with a highest likelihood of being an actual breach. The client device 150 can also isolate network nodes associated with one or more candidate breaches. Alternatively, the isolation module 238 can isolate network nodes associated with all candidate breaches with an above-threshold likelihood of being an actual breach.

In addition to, or alternatively from, isolating network nodes, one or more security operations can be performed based on a likelihood that a candidate breach is an actual breach. For instance, it may be useful to take immediate remedial action to prevent exposure of sensitive data associated with a candidate breach. The security engine 140 may select a security operation to perform based on the likelihood that the candidate breach is an actual breach, based on a severity of the candidate breach, based on one or more characteristics of the candidate breach (e.g., sensitivity of data associated with the breach), based on a liability score computed based on the breach and associated with a third party, or based on any combination of these or other factors. As such, the security engine 140 may be used to prevent and/or mitigate the effects of a breach by performing operations in addition to network node isolation.

The security engine 140 can automatically act in response to determining that a candidate breach is or likely is an actual breach. The security engine 140 can automatically find a certificate and/or credentials associated with a candidate breach, revoke the certificate and/or credentials, and initiate a process of resetting the certificate and/or credentials. Alternatively, the security engine 140 can automatically locate a port associated with a candidate breach and block the port or take a snapshot of data associated with the candidate breach and perform auditing and/or forensics on the snapshot. The security engine 140 may also automatically generate an insurance claim based on the candidate breach or may automatically notify the public via the network 160 of the candidate breach. In some embodiments, the security engine 140 can recommend a security operation or other action for a system or a user associated with a candidate breach. For example, the security engine 140 may recommend changing encryption keys, adjusting configuration information, changing access credentials, etc. The security engine 140 can automatically generate and send a message (e.g., to an entity associated with the candidate breach) indicating the likelihood that a candidate breach is an actual breach, and can include a recommendation of a security operation to perform within the message. The client device 150 may be associated with the system identity associated with the second query described above.

Example Methods

Figure 3:
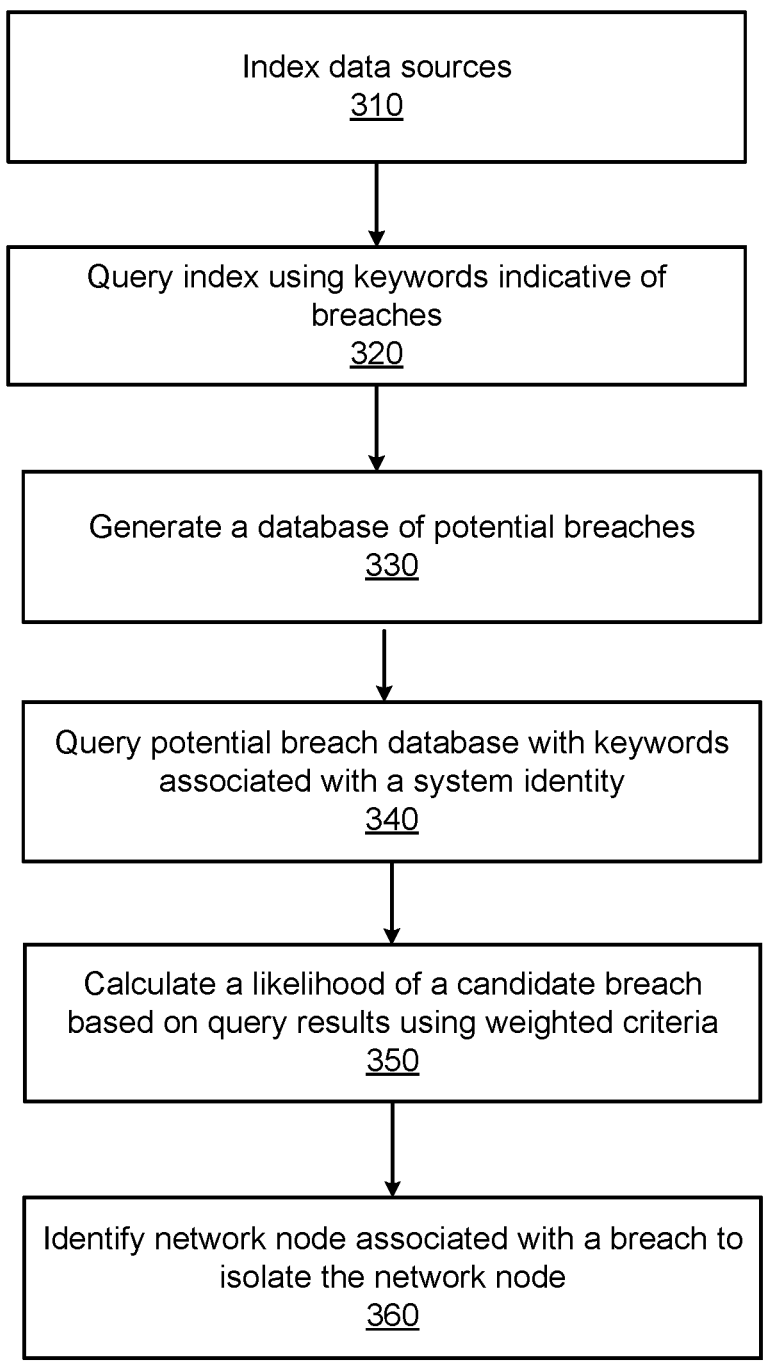
FIG. 3 is a flowchart illustrating a method for detecting breaches, according to one embodiment.

FIG. 3 illustrates a method 300 for detecting breaches across data sources, according to one embodiment. The steps of FIG. 3 are illustrated from the perspective of a system with a hardware processor performing the method 300. However, some or all of the steps may be performed by other systems or components. In addition, in some embodiments, the steps may be performed in parallel, in different orders, or asynchronously, and in other embodiments, different steps altogether may be performed.

One or more sources are indexed 310. The index is queried 320 using keywords indicative of potential breaches. The keywords can include "dev", "prod", etc. Based on the first query of the index, a database of potential breaches is generated 330. The potential breach database is queried 340 using information associated with a system identity (e.g., a third party). In some embodiments, the information used for the second query is a character string, domain, URL, or image associated with the system identity. The likelihood that a candidate breach is a breach is calculated 350 based on weighted criteria. The weighted criteria can include information such as a sensitivity level of data associated with the query results, a classification of data associated with the query results, a presence of system credentials within the query results, a presence of a source code within the query results, etc. A network node associated with a candidate breach is identified in order to isolate 360 the network node. In some embodiments, a network node associated with a candidate breach may be isolated if the candidate breach is associated with an above-threshold likelihood that the candidate breach is an actual breach. In addition to or alternatively, remedial actions can be taken in response to the candidate breach as described above in greater detail.

ADDITIONAL CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting and mitigating system breaches. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A method comprising:
indexing, by a computer, one or more data sources;
querying, by the computer, the index using keywords indicative of potential breaches to produce first query results;
generating, by the computer, a potential breach database by aggregating the first query results;
querying, by the computer, the potential breach database using keywords associated with a system identity to produce second query results;
identifying, by the computer, a candidate breach associated with the system identity based on the second query results;
computing, by the computer, a likelihood that the candidate breach associated with the system identity is an actual breach by weighting the second query results using a set of breach criteria weights; and
in response to the computed likelihood exceeding a breach threshold, identifying, by the computer, a network node associated with the candidate breach for isolation.

2. The method of claim 1, wherein each breach criteria weight is associated with a query result of the second query results and corresponds to a correlation between the query result and a breach.

3. The method of claim 1, wherein computing a likelihood that the candidate breach is an actual breach comprises:
computing, for each query result of the second query results, a breach score;
weighting, for each breach score, the breach score with an associated breach criteria weight to produce a weighted breach score; and
summing the weighted breach scores to produce the computed likelihood that the candidate breach is an actual breach.

4. The method of claim 1, wherein the likelihood is further computed based on a presence of access credentials included within the second query results.

5. The method of claim 1, wherein the likelihood is further computed based on a presence of one or more certificate authority keys within the second query results.

6. The method of claim 1, wherein the likelihood is further computed based on a presence of source code within the second query results.

7. The method of claim 1, further comprising:
automatically revoking, by the computer, a certificate associated with the candidate breach and initiating a process of resetting the certificate.

8. The method of claim 1, further comprising:
automatically revoking, by the computer, a password associated with the candidate breach and initiating a process of resetting the password.

9. The method of claim 1, further comprising:
automatically identifying, by the computer, a port associated with the candidate breach and blocking the port.

10. The method of claim 1, further comprising:
automatically generating, by the computer, a message indicating the computed likelihood and recommending a corresponding corrective action to take and providing the generated message to a client device associated with the system identity.

11. The method of claim 1, further comprising:
automatically computing, by the computer, a liability score associated with the system identity based on the computed likelihood and providing the liability score to a client device associated with the system identity.

12. A non-transitory computer-readable storage medium storing instructions for detecting security breaches, the instructions when executed by a processor cause the processor to perform steps including:

indexing one or more data sources;

querying the index using keywords indicative of potential breaches to produce first query results;

generating a potential breach database by aggregating the first query results;

querying the potential breach database using keywords associated with a system identity to produce second query results;

identifying a candidate breach associated with the system identity based on the second query results;

computing a likelihood that the candidate breach associated with the system identity is an actual breach by weighting the second query results using a set of breach criteria weights; and in response to the computed likelihood exceeding a breach threshold, identifying by the computer, a network node associated with the candidate breach for isolation.

13. The non-transitory computer-readable storage medium of claim 12, wherein each breach criteria weight is associated with a query result of the second query results and corresponds to a correlation between the query result and a breach.

14. The non-transitory computer-readable storage medium of claim 12, wherein computing a likelihood that the candidate breach is an actual breach comprises:

computing, for each query result of the second query results, a breach score;

weighting, for each breach score, the breach score with an associated breach criteria weight to produce a weighted breach score; and summing the weighted breach scores to produce the computed likelihood that the candidate breach is an actual breach.

15. The non-transitory computer-readable storage medium of claim 12, wherein the likelihood is further computed based on one of: a presence of access credentials included within the second query results, a presence of one or more certificate authority keys within the second query, or a presence of source code within the second query results.

16. The non-transitory computer-readable storage medium of claim 12, wherein the instruction when executed cause the processor to perform further steps comprising:

automatically revoking, by the computer, a certificate associated with the candidate breach and initiate a process of resetting the certificate.

17. A computing system comprising:

a processor; and a non-transitory computer-readable storage medium storing instructions for detecting security breaches, the instructions when executed by the processor cause the processor to perform steps including:

indexing one or more data sources;

querying the index using keywords indicative of potential breaches to produce first query results;

generating a potential breach database by aggregating the first query results;

querying the potential breach database using keywords associated with a system identity to produce second query results;

identifying a candidate breach associated with the system identity based on the second query results;

computing a likelihood that the candidate breach associated with the system identity is an actual breach by weighting the second query results using a set of breach criteria weights; and in response to the computed likelihood exceeding a breach threshold, identifying by the computer, a network node associated with the candidate breach for isolation.

18. The computing system of claim 17, wherein each breach criteria weight is associated with a query result of the second query results and corresponds to a correlation between the query result and a breach.

19. The computing system of claim 17, wherein computing a likelihood that the candidate breach is an actual breach comprises:

computing, for each query result of the second query results, a breach score;

weighting, for each breach score, the breach score with an associated breach criteria weight to produce a weighted breach score; and summing the weighted breach scores to produce the computed likelihood that the candidate breach is an actual breach.

20. The computing system of claim 17, wherein the likelihood is further computed based on one of: a presence of access credentials included within the second query results, a presence of one or more certificate authority keys within the second query, or a presence of source code within the second query results.

* * * * *